(12) United States Patent
Natori et al.

(10) Patent No.: US 6,854,898 B2
(45) Date of Patent: Feb. 15, 2005

(54) OPTICAL CONNECTOR

(75) Inventors: Nozomu Natori, Sakura (JP); Tetsuo Nozawa, Sakura (JP)

(73) Assignee: Fujikura, Ltd., Tokyo (JP)

( * ) Notice: Subject to any disclaimer, the term of this patent is extended or adjusted under 35 U.S.C. 154(b) by 72 days.

(21) Appl. No.: 10/286,433

(22) Filed: Nov. 1, 2002

(65) Prior Publication Data

US 2004/0086235 A1 May 6, 2004

(51) Int. Cl.$^7$ ............................................. G02B 6/36
(52) U.S. Cl. ........................... 385/78; 385/85; 385/84; 385/88; 385/89; 385/59; 385/60; 385/64; 385/82; 385/65
(58) Field of Search .................. 385/78, 85, 84, 385/88, 89, 59, 60, 64, 65, 82

(56) References Cited

U.S. PATENT DOCUMENTS

| | | | | |
|---|---|---|---|---|
| 5,815,621 A | * | 9/1998 | Sakai et al. ............... | 385/80 |
| 6,007,257 A | * | 12/1999 | Ogawa et al. ............. | 385/80 |
| 6,210,045 B1 | * | 4/2001 | Dean et al. ............... | 385/72 |
| 6,224,269 B1 | * | 5/2001 | Engstrand et al. ......... | 385/59 |
| 6,565,264 B1 | * | 5/2003 | Johnson et al. ............ | 385/78 |
| 6,623,175 B2 | * | 9/2003 | Suematsu et al. .......... | 385/78 |
| 6,669,377 B2 | * | 12/2003 | Barnes et al. ............. | 385/78 |
| 6,695,488 B2 | * | 2/2004 | Grabbe ..................... | 385/78 |
| 6,702,479 B2 | * | 3/2004 | Yang ........................ | 385/78 |
| 2002/0154867 A1 | * | 10/2002 | Ohtsuka et al. ........... | 385/78 |
| 2003/0031425 A1 | * | 2/2003 | Suematsu et al. .......... | 385/78 |
| 2003/0072537 A1 | * | 4/2003 | Eichenberger et al. ...... | 385/89 |
| 2003/0198442 A1 | * | 10/2003 | Cheng et al. .............. | 385/83 |
| 2003/0219209 A1 | * | 11/2003 | Kunkel et al. ............. | 385/52 |
| 2003/0235374 A1 | * | 12/2003 | Luther et al. ............. | 385/85 |

FOREIGN PATENT DOCUMENTS

JP            8278426        10/1996

* cited by examiner

*Primary Examiner*—Jared J. Fureman
*Assistant Examiner*—Allyson N Trail
(74) *Attorney, Agent, or Firm*—Hoffmann & Baron, LLP

(57) ABSTRACT

An object of the present invention is to provide an optical connector capable of preventing impairment of PC connections by a hard sleeve during PC connection of optical connectors having a hard sleeve installed in engaging pin holes thereof. The optical connector has a ferrule formed with integrally molded plastic and having engaging pin holes, and a hard sleeve installed in the engaging pin holes and having a hardness that is higher than the plastic of the ferrule. The hard sleeve and the plastic of the ferrule surrounding this hard sleeve are polished so as to be lower than the coupling end surface, and the end of the hard sleeve does not protrude beyond the coupling end surface.

4 Claims, 5 Drawing Sheets

OPTICAL CONNECTOR

BACKGROUND OF THE INVENTION

1. Field of the Invention

The present invention relates to an optical connector.

2. Background Art

Conventional mechanically transferable (MT) optical connectors (such as those defined in IEC 60874-16 or JIS C 5981) are known to be optical connectors in which connection is made by inserting and engaging an engaging pin in an engaging hole and positioning to make an end-to-end connection. In addition, multifiber push-on (MPO) optical connectors (such as those defined in IEC 61754-7 or JIS C 5982) are known to be optical connectors composed by using the MT optical connector as a ferrule and incorporating in a housing formed from plastic and so forth.

However, since the MT optical connectors typically employ a constitution in which a metal engaging pin is inserted and engaged in an engaging pin hole formed in a plastic ferrule, the engaging pin hole becomes worn due to retraction and insertion of the engaging pin, thereby resulting in the problem of this wear causing a decrease in positioning accuracy. Consequently, there is a need to prevent wear of the engaging pin hole so as to effectively prevent a decrease in positioning accuracy caused by wear of the engaging pin hole as well as the resulting problems such as an increase in connection loss.

In response to this need, a technique is known for suppressing wear of the engaging pin hole accompanying extraction and insertion of the engaging pin in which a hard sleeve comprised of a material having high hardness such as zirconia-based ceramics is installed in the engaging pin hole to serve as a lining.

In the case of installing a hard sleeve in the engaging pin hole, if the end of the hard sleeve protrudes from the connecting end surface of the optical connector, the ends of the hard sleeves collide with each other during end-to-end connection of two optical connectors, thereby resulting in the risk of impairment of the physical contact (PC) connection of the optical connectors.

Consequently, in Japanese Unexamined Patent Application, First Publication No. 8-278426, a method is disclosed for polishing the end surface of the hard sleeve using a diamond grinder having a diameter similar to that of the hard sleeve so as to regress the end surface of the hard sleeve farther back than the connecting end surfaces of the optical connectors. However, in the case of this method, since it is necessary to accurately align the diamond grinder at the location of the hard sleeve during polishing, this work is extremely difficult, thereby resulting in the risk of decreased yield. Moreover, since the hard sleeve has high hardness, considerable time is required for its polishing, thereby resulting in the problem of poor productivity.

In consideration of the problems, an object of the present invention is to provide an optical connector capable of preventing impairment of PC connection by the end of a hard sleeve during PC connection of optical connectors having a hard sleeve installed in their engaging pin holes.

SUMMARY OF THE INVENTION

In order to solve the problems, the optical connector of the present invention is provided with a ferrule formed with integrally molded plastic and having engaging pin holes, and a hard sleeve installed in the engaging pin holes and having a hardness that is higher than that of the plastic of the ferrule. The hard sleeve and the plastic of the ferrule surrounding this hard sleeve are polished so as to be lower than the coupling end surface, and the end of the hard sleeve does not protrude beyond the coupling end surface.

In addition, the optical connector of the present invention is provided with a ferrule formed with integrally molded plastic and having engaging pin holes, and a hard sleeve installed in the engaging pin holes and having a hardness that is higher than that of the plastic of the ferrule. The hard sleeve and the plastic of the ferrule that surrounds this hard sleeve are polished on an incline with respect to the coupling end surface so as to be lower than the coupling end surface, and the end of the hard sleeve does not protrude beyond the coupling end surface.

DESCRIPTION OF THE PREFERRED EMBODIMENTS

The following provides a detailed explanation of the optical connector of the present invention with reference to the drawings.

Figure 1:
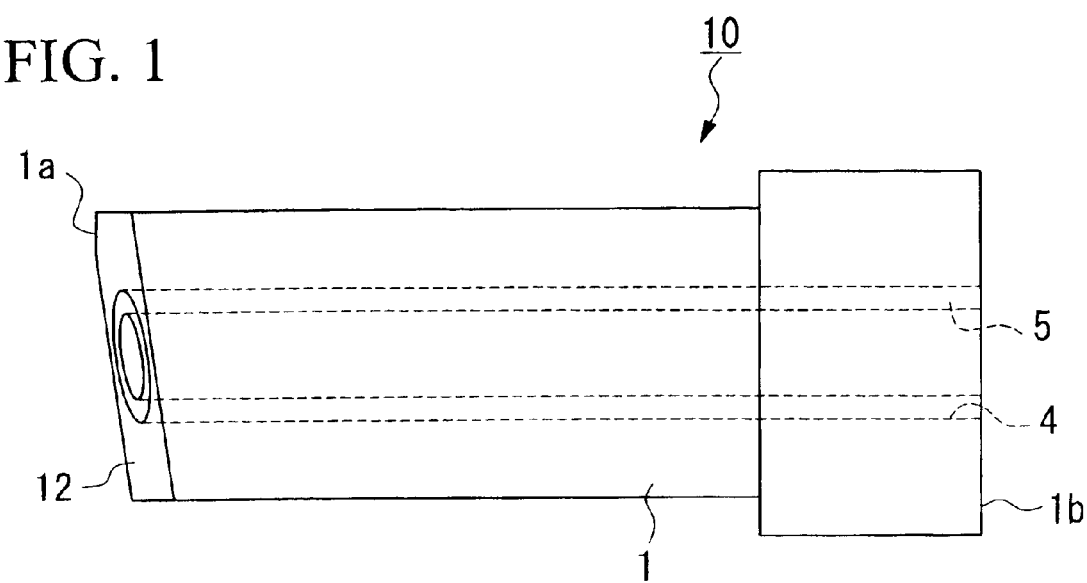
FIG. 1 is a side view showing the appearance of one embodiment of the optical connector of the present invention.

FIG. 1 is a slide view showing the appearance of one embodiment of the optical connector of the present invention.

Figure 2:
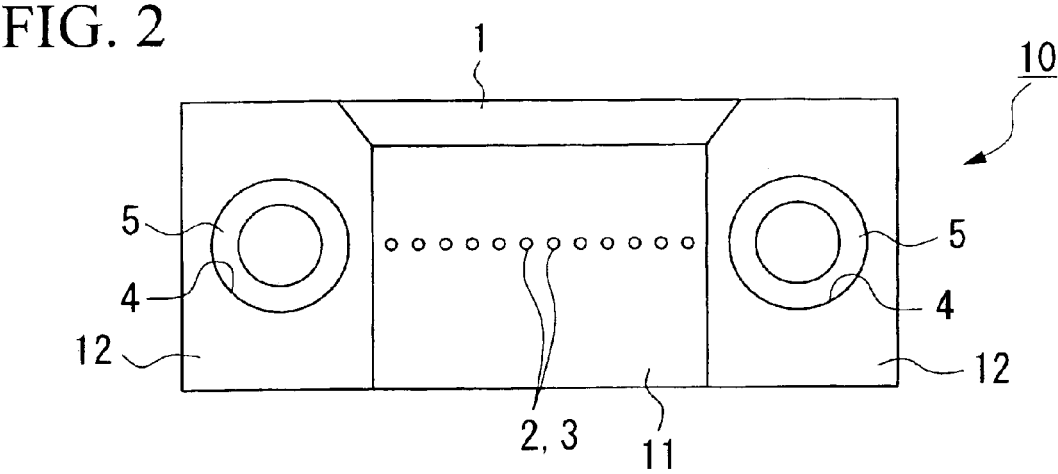
FIG. 2 is a front view showing the optical connector shown in FIG. 1.
Figure 3:
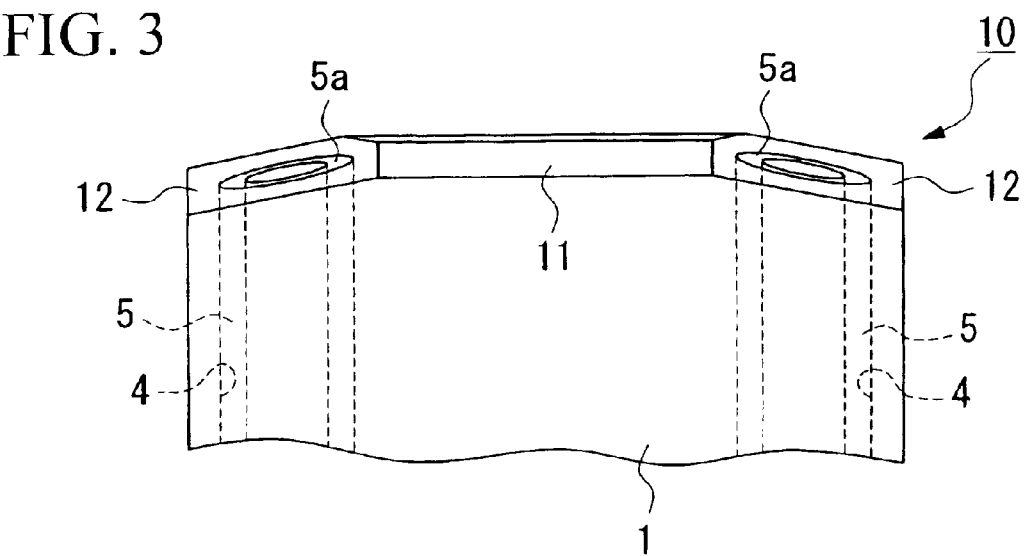
FIG. 3 is a bottom view showing the optical connector shown in FIG. 1.
Figure 4:
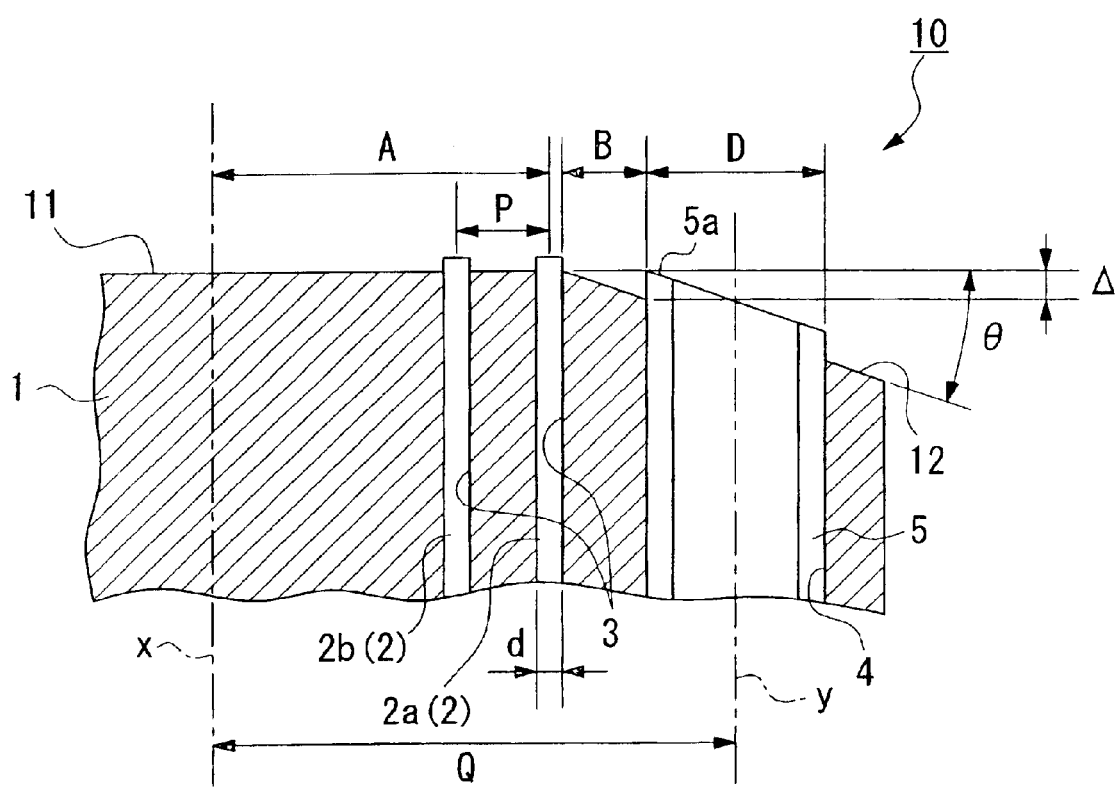
FIG. 4 is a partially enlarged view showing the periphery of the end of a hard sleeve in the optical connector shown in FIG. 1.

FIG. 2 is a side view showing the optical connector shown in FIG. 1, while FIG. 3 is a bottom view showing the optical connector shown in FIG. 1. FIG. 4 is a partially enlarged view showing the periphery of the end of a hard sleeve. Furthermore, the optical fiber holes are omitted from FIG. 3 since there is not enough space in the coupling end surface to show them in the drawing.

In these drawings, a reference symbol 10 indicates an optical connector. This optical connector 10 can be preferably applied to, for example, a multifiber push-on (MPO) optical connector (such as that defined in IEC 61754-7 or JIS C 5982).

The optical connector 10 is provided with a ferrule 1 formed with an integrally molded plastic, and a hard sleeve 5 installed in engaging pin holes 4 provided in both sides of the coupling end surface 11 of this ferrule 1.

The ferrule 1 is made of a plastic such as silica-filled epoxy resin, polyphenylene sulfide (PPS) or polybutylene terephthalate. As shown in FIGS. 1 and 3, the front end surface 1a of this ferrule 1 is polished to incline by a predetermined angle α (see FIG. 5) to form the coupling end surface 11. Optical fiber insertion holes 3 into which optical fibers 2 are inserted are opened in the coupling end surface 11.

The number of the optical fiber insertion holes 3 can be set as is suitable. Although 12 holes are shown in FIG. 2, the number of these holes is not limited to 12, for example, only a single optical fiber insertion hole 3 may be opened in the coupling end surface 11.

A pair of engaging pin holes 4 are provided to the left and right of the optical fiber insertion holes 3. The engaging pin holes 4 pass through ferrule 1 from its front end surface 1a to its rear end surface 1b. A hard sleeve made of a material having high hardness is inserted into each engaging pin hole 4.

A material that is at least harder than the plastic used to form the ferrule 1 is used for the material of the hard sleeves 5. In addition, a material is used that has a degree of wear resistance that does not practically present a problem with respect to repeated insertion and extraction of the engaging pins inserted into hard sleeve 5. Examples of such materials that can be used include ceramics such as zirconia or alumina, glass such as quartz glass and metal such as stainless steel. Ceramics are preferably used, and zirconia ceramics are used.

The end of the hard sleeve 5 and the plastic of the ferrule 1 that surrounds the engaging pin holes 4 are polished to form a polished end surfaces 12 which inclines by a predetermined angle α with respect to the coupling end surface 11.

Preferably, the end of the hard sleeve 5 is made to protrude farther than the plastic of the ferrule 1. As shown in FIG. 4, the protrusion of the end of the hard sleeve 5 farther than the plastic of the ferrule 1 does not only refer to the case in which the peripheral surface of the end of the hard sleeve 5 is completely exposed. It also includes the case in which the plastic of the ferrule 1 is pushed up towards the end of the hard sleeve 5, and the amount of adhesion of the periphery of the hard sleeve 5 to the plastic of ferrule 1 gradually decreases from the base section towards the protruding end so that only a small amount of plastic remains near the end peripheral surface.

Next, an explanation is provided of an example of a manufacturing method of the-mentioned optical connector 10.

First, optical fibers 2 are inserted into the optical fiber insertion holes 3, and optical fibers 2 are adhered to the optical fiber insertion hole 3 using an adhesive.

Figure 5:
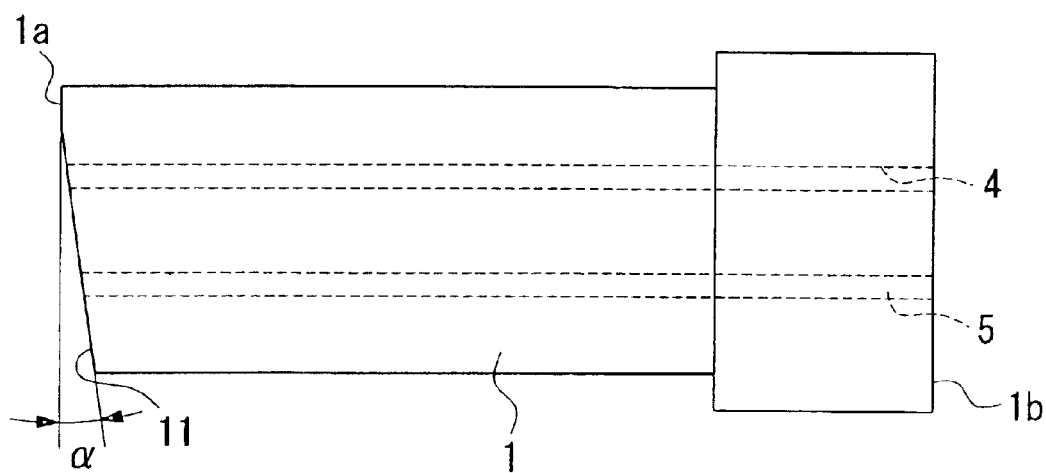
FIG. 5 is a side view showing an optical connector prior to the formation of polished end surfaces on both sides of a coupling end surface in a manufacturing process for manufacturing the optical connector shown in FIG. 1.
Figure 6:
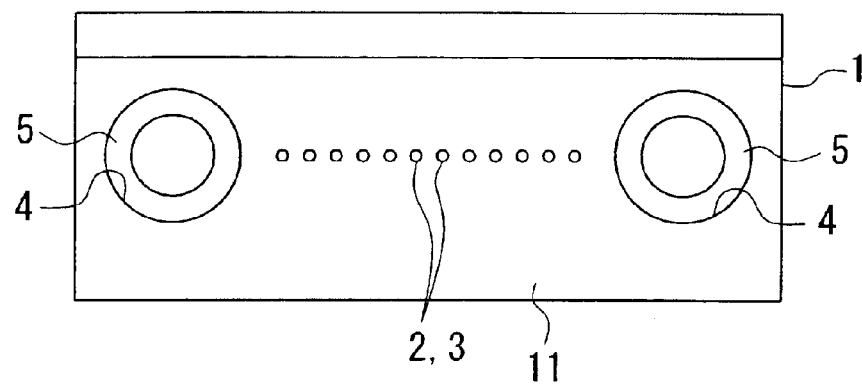
FIG. 6 is a front view showing the end surface of an optical connector prior to the formation of polished end surfaces on both sides of a coupling end surface in a manufacturing process for manufacturing the optical connector shown in FIG. 1.

Next, the front end surface 1a of the ferrule 1 is polished to incline by a predetermined angle α relative to the optical axis to form the coupling end surface 11 (FIGS. 5 and 6). A specific example of the angle α is defined as, for example, 8°±0.5° in IEC 61574-7.

An example of a specific polishing step for forming the coupling end surface 11 is a step in which adhesive protruding from the optical fiber insertion hole 3 is removed by rough polishing, and after the angled polishing of the front end surface 11a of the ferrule 1, the final precision polishing is performed by buffing.

Figure 7:
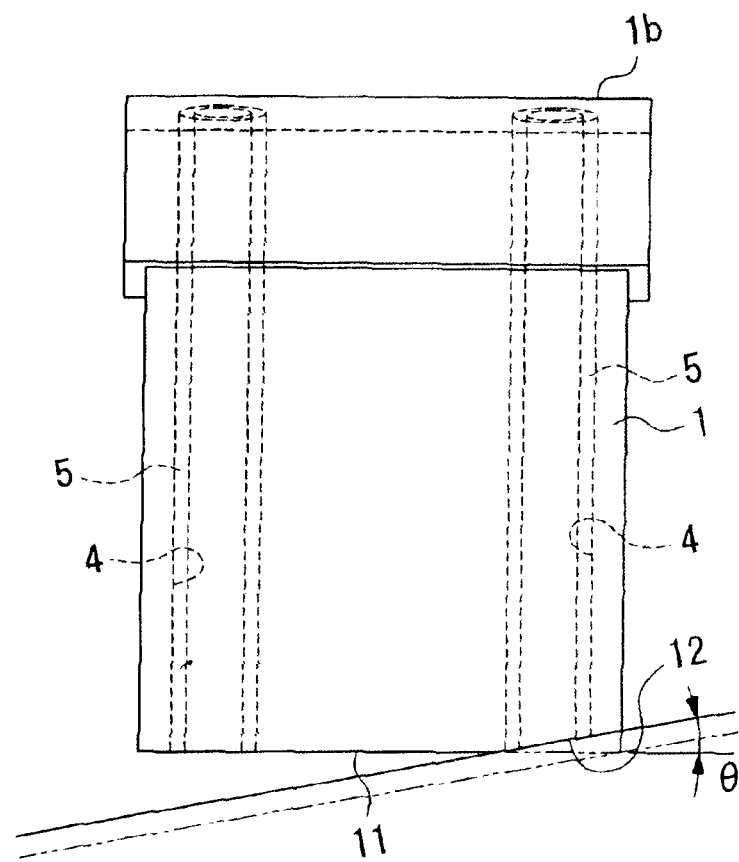
FIG. 7 is a front view showing the state of an optical connector during formation of polished end surfaces on both sides of a coupling end surface in a manufacturing process for manufacturing the optical connector shown in FIG. 1.
Figure 8:
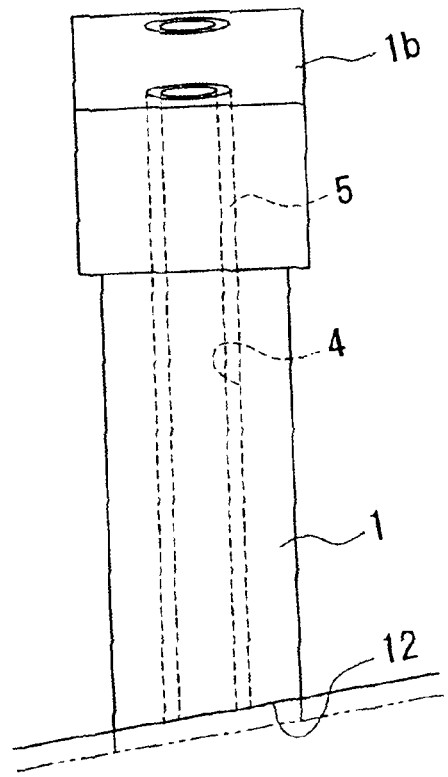
FIG. 8 is a side view showing the state of an optical connector during formation of polished end surfaces on both sides of a coupling end surface in a manufacturing process for manufacturing the optical connector shown in FIG. 1.

After forming the coupling end surface 11, as shown in FIGS. 4, 7, and 8, the ferrule 1 is inclined at an angle θ relative to the coupling end surface 11, and the hard sleeve 5 and the plastic of the ferrule 1 that surrounds this hard sleeve 5 are polished.

Since the hard sleeve 5 is harder than the plastic of the ferrule 1, when the hard sleeve 5 and the plastic of ferrule 1 that surrounds the hard sleeve 5 are polished, the hard sleeve 5 protrudes from the polished end surface 12 formed on the ferrule 1 after polishing. During manufacturing of the optical connector of the present invention, although the end 5a of the hard sleeve 5 may protrude from the polished end surface 12, it should not protrude from the coupling end surface 11.

Therefore, the following provides an explanation of an example of a method for determining the angle θ for ensuring that the end of the hard sleeve 5 does not protrude farther than the coupling end surface 11 of the optical connector 10 with reference to FIG. 4.

In FIG. 4, double-dot chain line x indicates the center line of the ferrule 1 (line located in the middle of the center line of the engaging pin hole 4). In addition, double-dot chain line y indicates the center line of the engaging pin hole 4.

Reference symbol 2a indicates an optical fiber 2 that is the closest to the engaging pin hole 4, while reference symbol 2b indicates an optical fiber 2 that is adjacent to the optical fiber 2a. Length P is the pitch of the optical fiber insertion hole 3.

Diameter d is the diameter of the optical fiber 2, while diameter D is the diameter of the engaging pin hole 4.

Length Q is the interval between the center line x of the ferrule 1 and the center line y of the engaging pin hole 4, and is equivalent to half the interval between the center lines y of two engaging pin holes 4.

Length B is the interval between the outer surface of the optical fiber 2a and the hard sleeve 5 inserted into the engaging pin hole 4.

Length Δ is the protruding height of the hard sleeve 5 from the polished end surface 12.

Length A is the interval between optical fiber 2a and the center line x of the ferrule 1.

The following relational expression (1) is valid with respect to the length A when the number of the optical fiber insertion holes 3 arranged in the direction of width of the coupling end surface 11 is taken to be n.

$$A=(1/2)(n-1)P \qquad (1)$$

In addition, the following relational expression (2) is valid as is clear from FIG. 4.

$$B=Q-A-d/2-D/2 \qquad (2)$$

Moreover, the following relational expression (3) is valid to ensure that the end 5a of the hard sleeve 5 does not protrude farther than the coupling end surface 11.

$$\tan\theta \geq \Delta/B \qquad (3)$$

Solving the relational expressions (1) through (3) makes it easy to determine a suitable angle θ for the desired optical connector 10.

For example, assuming that P=0.25 mm, Q=2.3 mm, d=0.125 mm and D=1.1 mm, and if a value of 0.004 mm is used as an example of a measured value of the length Δ, the results shown in Table 1 are obtained. In Table 1, θ min indicates the minimum value of the angle θ to ensure that the end 5a of the hard sleeve 5 does not protrude farther than the coupling end surface 11.

TABLE 1

| n | A/mm | θ min/° |
|---|------|---------|
| 4 | 0.375 | 0.17 |
| 8 | 0.875 | 0.28 |
| 12 | 1.375 | 0.73 |

In this manner, by determining the angle θ and polishing the hard sleeve 5 and the plastic of the ferrule 1 that surrounds the hard sleeve 5, the protrusion of the end 5a of the hard sleeve 5 farther than the coupling end surface 11 is effectively prevented. Thus, when making a PC connection for the optical connector 10 in which the hard sleeve 5 is installed in the engaging pin holes 4, impairment of the PC connection by end 5a of the hard sleeve 5 can be effectively prevented.

The number of steps required for polishing can be reduced as a result of the end 5a of the hard sleeve 5 protruding farther than the polished end surface 12. In other words, the product resulting from polishing the hard sleeve 5 and the plastic of ferrule 1 that surrounds this hard sleeve 5 in a single step can be used as the optical connector 10. There is no need to additionally polish the end 5a of the hard sleeve 5.

Figure 9:
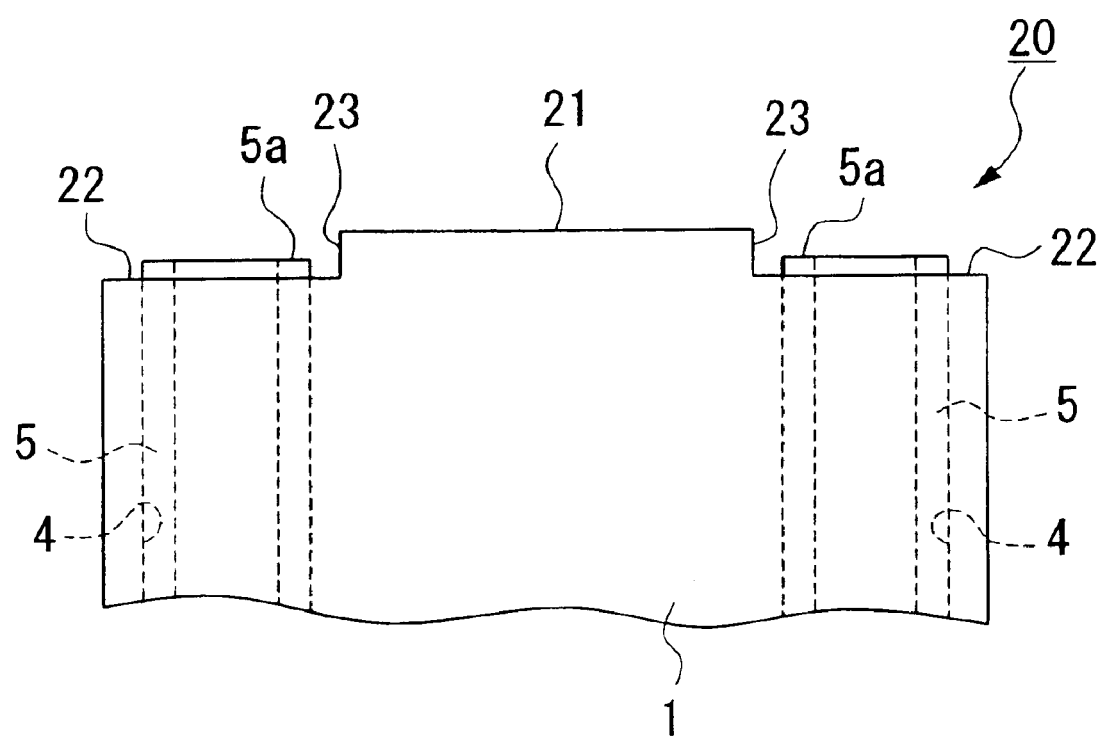
FIG. 9 is a partial overhead view showing another embodiment of the optical connector of the present invention.

Another embodiment of the present invention is shown in FIG. 9. In this embodiment, the polished end surface 22 surrounding the hard sleeve 5 is lowered by a step 23 with respect to the coupling end surface 21, and the hard sleeve 5 and the plastic of ferrule 1 that surrounds this hard sleeve 5 are polished so as to be lower than the coupling end surface 21. In this type of optical connector 20, since the end 5a of the hard sleeve 5 is not protruding farther than the coupling end surface 21, impairment of a PC connection by end 5a of hard sleeve 5 can be effectively prevented when making a PC connection.

The present invention is not limited to the embodiments. Various modifications can be achieved, and such modifications are all included in the scope of the present invention.

What is claimed is:

1. An optical connector comprising;

a ferrule formed of integrally molded plastic and having a coupling end surface and engaging pin holes; and a hard sleeve installed in each of the engaging pin holes and having a hardness that is higher than that of the plastic of the ferrule, wherein the hard sleeve and the plastic of the ferrule that immediately surrounds this hard sleeve are polished so as to be lower than the coupling end surface, and wherein the most protruding point of the end of the hard sleeve protrudes beyond the plastic of the ferrule that immediately surrounds the hard sleeve, but does not protrude beyond the coupling end surface.

2. An optical connector according to claim 1, wherein the material of the hard sleeve is made of ceramics.

3. An optical connector comprising:

a ferrule formed of integrally molded plastic and having a coupling end surface and engaging pin holes; and a hard sleeve installed in each of the engaging pin holes and having a hardness that is higher than that of the plastic of the ferrule, wherein the hard sleeve and the plastic of the ferrule that immediately surrounds this hard sleeve are polished to incline with respect to the coupling end surface so as to be lower than the coupling end surface, and the most protruding point of the end of the hard sleeve protrudes beyond the plastic of the ferrule that immediately surrounds the hard sleeve, but does not protrude beyond the coupling end surface.

4. An optical connector according to claim 3, further comprising an optical fiber disposed within the coupling end surface of the ferrule and wherein the hard sleeve and the plastic of the ferrule that immediately surrounds this hard sleeve are polished to incline with respect to the coupling end surface at an angle θ, and the most protruding point of the end of the hard sleeve protrudes beyond the plastic of the ferrule that immediately surrounds the hard sleeve at a distance Δ, and an outer surface of the optical fiber and the hard sleeve are spaced a distance B, and wherein $\tan \theta \geq \Delta/B$.

* * * * *